United States Patent
Walter

(10) Patent No.: US 9,932,661 B2
(45) Date of Patent: Apr. 3, 2018

(54) PROCESS FOR PRODUCING A HIGH-TEMPERATURE PROTECTIVE COATING

(71) Applicant: MTU Aero Engines AG, Munich (DE)

(72) Inventor: Heinrich Walter, Friedberg (DE)

(73) Assignee: MTU AERO ENGINES AG, Munich (DE)

( * ) Notice: Subject to any disclaimer, the term of this patent is extended or adjusted under 35 U.S.C. 154(b) by 461 days.

(21) Appl. No.: 14/259,331

(22) Filed: Apr. 23, 2014

(65) Prior Publication Data

US 2014/0322555 A1   Oct. 30, 2014

(30) Foreign Application Priority Data

Apr. 24, 2013 (DE) .................... 10 2013 207 457

(51) Int. Cl.

| | |
|---|---|
| *C23C 10/26* | (2006.01) |
| *C23C 10/60* | (2006.01) |
| *B32B 15/01* | (2006.01) |
| *C23C 10/30* | (2006.01) |
| *C23C 10/14* | (2006.01) |
| *C23C 10/32* | (2006.01) |
| *C23C 10/38* | (2006.01) |
| *C23C 10/48* | (2006.01) |
| *C23C 10/54* | (2006.01) |
| *C23C 28/00* | (2006.01) |
| *C23C 10/50* | (2006.01) |
| *C23C 28/02* | (2006.01) |
| *C23C 10/52* | (2006.01) |
| *C23C 10/56* | (2006.01) |
| *C23C 24/08* | (2006.01) |

(52) U.S. Cl.

CPC .......... *C23C 10/26* (2013.01); *B32B 15/017* (2013.01); *C23C 10/14* (2013.01); *C23C 10/30* (2013.01); *C23C 10/32* (2013.01); *C23C 10/38* (2013.01); *C23C 10/48* (2013.01); *C23C 10/50* (2013.01); *C23C 10/52* (2013.01); *C23C 10/54* (2013.01); *C23C 10/56* (2013.01); *C23C 10/60* (2013.01); *C23C 24/085* (2013.01); *C23C 24/087* (2013.01); *C23C 28/022* (2013.01); *C23C 28/3215* (2013.01); *Y10T 428/12063* (2015.01)

(58) Field of Classification Search

CPC ....... C23C 10/14; C23C 10/30; C23C 24/087; C23C 10/26; C23C 10/60; C23C 10/32; C23C 10/38; C23C 10/48; C23C 28/022; C23C 28/3215; C23C 30/00; C23C 10/50; C23C 10/52; C23C 10/54; C23C 10/56; C23C 30/005; C23C 4/085; C23C 24/085; B32B 15/017; B32B 15/043; B32B 15/20; Y10T 428/12063; Y10T 428/12458; Y10T 428/1275; Y10T 428/12757; Y10T 428/12854; Y10T 428/12931; Y10T 428/12937; Y10T 428/12944; Y10T 428/12958

See application file for complete search history.

(56) References Cited

U.S. PATENT DOCUMENTS

| | | | |
|---|---|---|---|
| 4,246,323 A | | 1/1981 | Bornstein et al. |
| 4,910,092 A | | 3/1990 | Olson et al. |
| 5,225,246 A | * | 7/1993 | Beers ............... C23C 10/04 29/889.7 |
| 6,709,711 B1 | | 3/2004 | Wydra et al. |
| 8,431,238 B2 | | 4/2013 | Payne et al. |
| 2007/0098913 A1 | | 5/2007 | Raybould et al. |
| 2009/0208775 A1 | | 8/2009 | Payne et al. |
| 2010/0266409 A1 | | 10/2010 | Chandra et al. |

FOREIGN PATENT DOCUMENTS

| | | |
|---|---|---|
| DE | 2842848 A1 | 4/1979 |
| DE | 19824792 A1 | 12/1999 |
| DE | 102009008510 A1 | 8/2010 |
| EP | 0587341 A1 | 3/1994 |
| EP | 2096194 A2 | 9/2009 |
| GB | 2006274 A | 5/1979 |
| WO | 2007101465 A1 | 9/2007 |

\* cited by examiner

*Primary Examiner* — Michael E. La Villa
(74) *Attorney, Agent, or Firm* — Abel Law Group, LLP

(57) ABSTRACT

Disclosed is a process for producing a high-temperature protective coating for metallic components, in particular components of turbomachines which are subjected to thermal loading. The process comprises producing a slip from MCrAlY powder, in which M is at least one metal, and from a Cr powder, applying the slip to the component to be coated and subsequently alitizing the component provided with the slip.

16 Claims, No Drawings

PROCESS FOR PRODUCING A HIGH-TEMPERATURE PROTECTIVE COATING

CROSS-REFERENCE TO RELATED APPLICATIONS

The present application claims priority under 35 U.S.C. § 119 of German Patent Application No. 102013207457.3, filed Apr. 24, 2013, the entire disclosure of which is expressly incorporated by reference herein.

BACKGROUND OF THE INVENTION

1. Field of the Invention

The present invention relates to a process for producing a high-temperature protective coating for metallic components, in particular components of turbomachines, such as of stationary gas turbines or aircraft engines, which are subjected to thermal loading. Moreover, the present invention relates to corresponding components, in particular of turbomachines, which are subjected to thermal loading and are provided with such a coating.

2. Discussion of Background Information

In the case of components of turbomachines, for example main blade parts, which are exposed to high temperatures, provision is made of suitable coatings in order to protect the base material against hot gas corrosion, for example. In this respect, it is known, for example, to use what are termed MCrAlY alloys as the coating material, where M represents a metal such as nickel, cobalt or a combination of nickel and cobalt, these forming protection against further corrosion at high operating temperatures by virtue of the formation of slowly growing chromium oxide layers or aluminum oxide layers. At temperatures of below 850° C., use is usually made of MCrAlY alloys having a composition which is selected in such a way that, on account of the correspondingly high chromium contents, chromium oxide formation is preferred, this being advantageous particularly in the case of a sulfidation attack. At temperatures of above 850° C., a suitable composition of the coating promotes the aluminum oxide formation, in order to counteract an oxidation attack.

In this context, the so-called MCrAlY layers can additionally be subjected to alitizing in order to promote the aluminum oxide formation by virtue of the additional deposition of aluminum and the thus induced enrichment of aluminum in the coating. However, coatings of this type have a low sulfidation resistance.

Examples of MCrAlY coatings, particularly also for components of turbomachines, are described in DE 28 428 848, EP 2 096 194 A2 and US 2007/0098913 A1, the entire disclosures of which are incorporated by reference herein. However, in the coatings of the prior art, the chromium proportions are in some cases added to the alloy in the form of chromium carbide particles, and therefore the proportion of metallic chromium is low. In addition, corresponding application processes, for example kinetic cold spraying, are described, but these are not suitable for all applications.

It is nevertheless advantageous for improving the sulfidation resistance, however, to increase the proportion of metallic chromium in an aluminum-rich MCrAlY coating, in order both to achieve a good oxidation resistance and to improve the sulfidation resistance by virtue of the high aluminum proportion.

It would therefore be advantageous to be able to provide a high-temperature protective coating for metallic components, in particular components of turbomachines which are subjected to thermal loading, and also a process for producing the coating, wherein the coating makes it possible to achieve both a good sulfidation resistance and a good oxidation resistance while achieving or retaining required mechanical properties of the coating and of the coated component, and wherein it should be possible for the process to be carried out easily and reliably.

SUMMARY OF THE INVENTION

The present invention provides a process for producing a high-temperature protective coating for metallic components, in particular components of turbomachines which are subjected to thermal loading. The process comprises producing a slip from an MCrAlY powder, in which M is at least one metal, and from a Cr powder, applying the slip to the component to be coated, and alitizing the component provided with the slip.

In one aspect of the process, the Cr powder and the MCrAlY powder may be selected in a Cr to MCrAlY ratio of less than or equal to 10, for example, less than or equal to 5, or less than or equal to 4 and/or the Cr powder and the MCrAlY powder may be selected in a Cr to MCrAlY ratio of less than or equal to 3, for example, less than or equal to 1, or less than or equal to 0.25.

In another aspect of the process, the Cr powder and the MCrAlY powder may be selected in a Cr to MCrAlY ratio in the range of from 0.001 to 10, e.g., from 0.01 to 4, or from 0.05 to 1.

In yet another aspect of the process of the present invention, the Cr powder may be selected with a grain size of less than or equal to 20 μm, e.g., less than or equal to 10 μm, or less than or equal to 5 μm and/or the Cr powder may be selected with a mean grain size of less than or equal to 20 μm, e.g., less than or equal to 10 μm, or less than or equal to 5 μm.

In a still further aspect of the process, the MCrAlY powder may be selected with a grain size of less than or equal to 20 μm, e.g., of less than or equal to 10 μm and/or the MCrAlY powder may be selected with a mean grain size of less than or equal to 20 μm, e.g., less than or equal to 10 μm, or in the range of 5 μm to 10 μm.

In another aspect of the process, the metal M of the MCrAlY powder may be selected from at least one of Fe, Co, Ni.

In another aspect, the slip may comprise water and/or at least one liquid organic compound, in particular an oil, preferably screen-printing oil.

In another aspect of the process, at least two, preferably a plurality of, layers of slip may be applied in succession, drying in vacuo and/or an ambient atmosphere and/or diffusion annealing being carried out in particular after each application.

In another aspect, at least two, preferably a plurality of, layers of slip of differing composition, in particular with a different proportion of Cr powder, may be applied.

In another aspect of the process of the present invention, the alitizing may be carried out as gas-phase alitizing.

The present invention further provides a component, in particular a component of a turbomachine, comprising an MCrAlY coating, in which M is at least one metal and which has been produced preferably by the process according to the present invention as set forth above (including the various aspects thereof). The outer marginal layer of the coating has a proportion of metallic Cr of at least 20% by weight, preferably at least 25% by weight, and a proportion of Al of at least 20% by weight, preferably at least 25% by weight.

In one aspect of the component, the component may be formed from a superalloy and the metallic proportion M of the coating may correspond at least in part to the main alloying constituent of the superalloy and may be selected from at least one of Fe, Co, Ni.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description making apparent to those of skill in the art how the several forms of the present invention may be embodied in practice.

What is proposed according to the invention is a process for producing a high-temperature protective coating for metallic components, in which firstly for the coating a slip is produced from an MCrAlY powder and a chromium powder, wherein the MCrAlY powder comprises at least one metal M which can be selected from the group of elements that comprises iron, cobalt, nickel. The slip is applied to the component to be coated and then the layer produced by the slip application is additionally alitized in order to increase the aluminum proportion. The admixture of chromium powder to the slip and the subsequent alitizing of the intermediate layer produced by the slip make it possible to produce both a high aluminum and a high chromium content in the finished coating, and therefore the thus produced high-temperature protective coating is resistant both to oxidation attacks and to sulfidation attacks. In particular, the process according to the invention makes it possible for the chromium proportion in a corresponding aluminum-rich protective layer to be varied within a large range as desired in a simple manner, such that a corresponding adjustment of the composition of the coating to the specific profile of requirements is possible.

The chromium powder and the MCrAlY powder can be selected in a chromium to MCrAlY weight ratio of less than or equal to 10, in particular less than or equal to 5, preferably less than or equal to 4, very particularly preferably less than or equal to 3 or less than or equal to 1 or less than or equal to 0.25. The chromium to MCrAlY ratio in the powder mixture of chromium powder and MCrAlY powder can therefore be selected to be in the range of from 0.001 to 10, in particular from 0.001 to 4 and preferably in the range of from 0.05 to 1. It is therefore possible to realize a large range of different compositions, particularly with different chromium proportions.

The MCrAlY powder, in which the M can be formed by at least one element selected from nickel, cobalt and iron, can have proportions of from 10% by weight to 40% by weight of aluminum, from 0.01% by weight to 5% by weight of yttrium and also from 0.1% by weight to 1% by weight of hafnium. In particular, it is possible to use commercially available MCrAlY powders (which may comprise one or more additional elements such as, e.g., silicon).

The chromium powder can be added to the slip with grain sizes of less than or equal to 20 µm, in particular less than or equal to 10 µm, preferably less than or equal to 5 µm. The details relating to the grain size can refer to the maximum grain sizes of the chromium powder or corresponding mean grain sizes of the chromium powder. In the same way, the MCrAlY powder can be present in the slip with a maximum grain size or a mean grain size of less than or equal to 20 µm, in particular less than or equal to 10 µm and preferably in the range of from 5 µm to 10 µm.

In addition to the powder mixture of chromium powder and MCrAlY powder, the slip can comprise water and/or at least one liquid organic compound, in particular an oil, preferably screen-printing oil.

After the slip has been applied, it can firstly be dried, to be precise at temperatures of from room temperature up to 200° C., in particular at temperatures of from 50° C. to 100° C. The drying can be effected here in an ambient atmosphere or in vacuo or a protective gas atmosphere. The drying can additionally be carried out in a plurality of successive steps with different drying operations, for example different temperatures and atmospheres.

Before the further step of alitizing, the layer of slip can moreover be subjected to a diffusion annealing treatment, which can likewise be carried out in vacuo and/or under protective gas.

During the application of the slip, it is also possible for a plurality of layers of slip, for example two or more layers, to be applied in succession, it being possible for drying and/or diffusion annealing to take place after each application.

Above all, it is possible to apply a plurality of layers of slip of differing composition in succession in order to produce a gradient layer in which the composition of the coating varies over the thickness of the layer. In particular, the layers of slip can have different proportions of chromium powder so as to make it possible to set a chromium gradient.

The alitizing can be carried out by gas-phase alitizing, in which aluminum-containing donor material, for example aluminum powder, together with an activator or a starting material for an activator, for example a halogen compound, is exposed to a high temperature for a certain period of time in order to bring about aluminum enrichment in the surface of the correspondingly treated component. At the same time, it is possible to provide a reducing atmosphere, for example consisting of a mixture of a protective gas or inert gas, such as argon, and hydrogen, in the corresponding reaction chamber.

A corresponding coating can be provided in particular on a component formed from a superalloy of which the main alloying constituent corresponds to the metallic proportion M of the MCrAlY powder used for the coating. By way of example, this can be an iron, cobalt or nickel base alloy, the coating being produced from an FeCrAlY, CoCrAlY or NiCrAlY powder or NiCoCrAlY powder. Superalloys are understood to mean materials of which the operating temperatures are higher than those of steels, since they have a high strength at high temperatures by virtue of appropriate precipitation hardening.

EXEMPLARY EMBODIMENT

Further advantages, characteristics and features of the present invention will become clear from the following detailed description of an exemplary embodiment, the invention not being limited to this exemplary embodiment.

A component made of the alloy PW 1484, which has a composition of 3% by weight to 12% by weight chromium, 0% by weight to 3% by weight molybdenum, 3% by weight to 10% by weight tungsten, 0% by weight to 5% by weight rhenium, 6% by weight to 12% by weight tantalum, 4% by weight to 7% by weight aluminum, 0% by weight to 15% by weight cobalt and also further unavoidable impurities and minor alloying constituents, remainder nickel, was coated with a slip which had been produced from a mixture of MCrAlY powder consisting of NiCr30Co10Al4Si1Y1Hf0.5 and various proportions of chromium powder. The proportions of chromium powder were varied such that the mixture contained chromium powder at 20% by weight, 40% by weight and 60% by weight.

100 parts by weight of the powder mixture were processed with 15 parts by weight of a screen-printing oil and 10 parts by weight of water to form a slip mixture.

The screen-printing oil can be formed, for example, by ethyl cellulose, butyl lactate and polyethylene glycol or by nitrocellulose, diacetone alcohol, 2-ethylhexyl acetate and zircogel (precipitated zirconium oxide hydrate).

The slip was mixed in a roller mixer for more than 24 hours and applied to the component to be coated by spraying.

After it had been applied, the slip was dried at 50° C. in vacuo and then at 100° C. in air for up to half an hour. The component was given two layers of applied slip with respective drying after each application.

Then, the component was subjected to gas-phase alitizing, in which the aluminum-containing donor material was deposited on the component to be coated by means of the activator $AlF_3$. The alitizing was carried out at a temperature of approximately 1100° C. for 6 hours in an argon/hydrogen atmosphere. For the components coated with various chromium powder proportions, the following proportions by weight arose after completion of the alitizing process in the region of the outer layer, i.e. down to a layer depth of 55 μm:

| Chromium powder proportion in the powder mixture | Aluminum proportion in the layer | Chromium proportion in the layer | Nickel proportion in the layer |
|---|---|---|---|
| 0% by weight | 30% by weight | 16% by weight | 44% by weight |
| 20% by weight | 29% by weight | 22% by weight | 40% by weight |
| 40% by weight | 29% by weight | 32% by weight | 33% by weight |
| 60% by weight | 27% by weight | 39% by weight | 28% by weight |

The results show that the process according to the invention makes it possible for the chromium proportion in the coating to be varied within a wide range with a constantly high aluminum proportion.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for producing a high-temperature protective coating for metallic components, wherein the process comprises:
    producing a slip comprising (i) a powder of Cr metal and (ii) a powder of MCrAlY alloy, in which M represents at least one metal;
    applying the slip to the component to be coated; and
    alitizing the component provided with the slip.

2. The process of claim 1, wherein a weight ratio of (i) and (ii) is not higher than 10.

3. The process of claim 2, wherein the weight ratio of (i) and (ii) is not higher than 3.

4. The process of claim 2, wherein the weight ratio of (i) and (ii) is from 0.001 to 10.

5. The process of claim 2, wherein (i) has a maximum grain size and/or a mean grain size of less than or equal to 10 μm, (ii) has a maximum grain size and/or a mean grain size of less than or equal to 10 μm, M represents one or more of Fe, Co and Ni, the slip comprises water and/or at least one liquid organic compound, and at least two layers of slip are applied in succession.

6. The process of claim 1, wherein (i) has a maximum grain size of not more than 20 μm.

7. The process of claim 6, wherein (ii) has a maximum grain size of not more than 20 μm.

8. The process of claim 1, wherein (i) has a mean grain size of not more than 20 μm.

9. The process of claim 8, wherein (ii) has a mean grain size of not more than 20 μm.

10. The process of claim 1, wherein M represents one or more of Fe, Co and Ni.

11. The process of claim 1, wherein the slip comprises water and/or at least one liquid organic compound.

12. The process of claim 11, wherein the liquid organic compound comprises an oil.

13. The process of claim 1, wherein at least two layers of slip are applied in succession.

14. The process of claim 13, wherein drying in vacuo and/or in ambient atmosphere and/or diffusion annealing is carried out after each application of a layer of slip.

15. The process of claim 1, wherein at least two layers of slip of differing composition are applied.

16. The process of claim 15, wherein the at least two layers comprise different proportions of (i).

* * * * *